US009457542B2

(12) United States Patent
Shimizu et al.

(10) Patent No.: US 9,457,542 B2
(45) Date of Patent: Oct. 4, 2016

(54) JOINED BODY OF DISSIMILAR ALUMINUM ALLOY MATERIALS, AND VEHICLE DOOR

(71) Applicant: SHIROKI CORPORATION, Kanagawa (JP)

(72) Inventors: Kenji Shimizu, Kanagawa (JP); Shigenobu Ohsawa, Kanagawa (JP); Jiro Yoshihara, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 196 days.

(21) Appl. No.: 14/151,918

(22) Filed: Jan. 10, 2014

(65) Prior Publication Data
US 2015/0197072 A1    Jul. 16, 2015

(51) Int. Cl.
| | | |
|---|---|---|
| *B32B 15/01* | (2006.01) | |
| *B23K 9/00* | (2006.01) | |
| *B23K 9/23* | (2006.01) | |
| *B23K 20/233* | (2006.01) | |
| *B60J 5/04* | (2006.01) | |
| *C22C 21/08* | (2006.01) | |
| *C22C 21/06* | (2006.01) | |
| *B23K 20/12* | (2006.01) | |

(52) U.S. Cl.
CPC ............ *B32B 15/016* (2013.01); *B23K 9/00* (2013.01); *B23K 9/0026* (2013.01); *B23K 9/232* (2013.01); *B23K 20/1265* (2013.01); *B23K 20/2336* (2013.01); *B60J 5/048* (2013.01); *B60J 5/0408* (2013.01); *B60J 5/0483* (2013.01); *C22C 21/06* (2013.01); *C22C 21/08* (2013.01); *B23K 2201/006* (2013.01); *B23K 2203/10* (2013.01); *B23K 2203/18* (2013.01); *B32B 2605/00* (2013.01); *Y10T 428/12764* (2015.01)

(58) Field of Classification Search
None
See application file for complete search history.

(56) References Cited

U.S. PATENT DOCUMENTS

| | | | | |
|---|---|---|---|---|
| 6,468,613 B1 * | 10/2002 | Kitano | ............. | B32B 15/08 428/113 |
| 6,471,112 B2 * | 10/2002 | Satou | ............. | B23K 20/12 228/112.1 |
| 7,166,205 B2 * | 1/2007 | Kuo | ............. | C25D 11/22 205/174 |

FOREIGN PATENT DOCUMENTS

| | | |
|---|---|---|
| JP | 2001-081903 | 3/2001 |
| JP | 2002-283069 A | 10/2002 |
| JP | 2007-111716 | 5/2007 |

OTHER PUBLICATIONS

English Translation Abstract of JP 2002-283069 published Oct. 2, 2002.
Japanese Office Action for Application No. 2012-157045; dated Mar. 1, 2016.

(Continued)

*Primary Examiner* — Daniel J Schleis
(74) *Attorney, Agent, or Firm* — Millen, White, Zelano & Branigan, P.C.

(57) ABSTRACT

A joined body of dissimilar aluminum alloy materials includes a first Al—Mg—Si aluminum alloy material, a second Al—Mg—Si aluminum alloy material, and a single Al—Mg aluminum alloy material. The joined body of dissimilar aluminum alloy materials is formed by welding the first Al—Mg—Si aluminum alloy material and the second Al—Mg—Si aluminum alloy material to the single Al—Mg aluminum alloy material. The Al—Mg aluminum alloy material and the first Al—Mg—Si aluminum alloy material are joined by arc welding. The Al—Mg aluminum alloy material and the second Al—Mg—Si aluminum alloy material are joined by friction-stir welding.

3 Claims, 2 Drawing Sheets

(56) References Cited

OTHER PUBLICATIONS

English Translation of Japanese Office Action for Application No. 2012-157045; dated Mar. 1, 2016.

English Abstract of JP 2001-081903; Mar. 27, 2001; Friction Stirring Joint Extrusion Section; Hitachi Ltd.

English Abstract of JP 2007-111716; May 10, 2007; Clamping Device, Welding Equipment and Welding Method; Showa Denko KK.

* cited by examiner

JOINED BODY OF DISSIMILAR ALUMINUM ALLOY MATERIALS, AND VEHICLE DOOR

BACKGROUND OF THE INVENTION

1. Field of the Invention

The present invention relates to a joined body of two dissimilar types of aluminum alloy materials, and relates to a vehicle door.

2. Description of Related Art

Dissimilar aluminum alloy materials that are mutually dissimilar mainly in regard to component content, such as Mg, are known in the art. For instance, an Al—Mg aluminum alloy material (aluminum alloy material containing Mg/JIS (Japanese Industrial Standard) 5000-series aluminum alloy material) is greater in mechanical strength than an Al—Mg—Si aluminum alloy material (aluminum alloy material containing Mg and Si/JIS 6000-series aluminum alloy material). To join aluminum alloy materials, welding (e.g., spot welding, arc welding, laser welding, and friction-stir welding (friction-stir joining)), rivet joining (including SPR (self-piercing riveting)), bonding, etc., are known in the art; among which welding is frequently selected and performed.

Japanese Unexamined Patent Publication No. 2002-283069 discloses a friction-stir welding technique for joining an Al—Mg—Si aluminum alloy material and an Al—Mg aluminum alloy material by friction-stir welding. However, the above-mentioned Japanese Unexamined Patent Publication deals with the case where the two alloy materials to be joined by welding are an Al—Mg aluminum alloy material and an Al—Mg—Si aluminum alloy material which have a special (specific) shape, and does not disclose any technique of welding an Al—Mg aluminum alloy material and a plurality of Al—Mg—Si aluminum alloy materials.

SUMMARY OF THE INVENTION

The present invention provides a novel joined body of dissimilar aluminum alloy materials which is made by welding a first Al—Mg—Si aluminum alloy material and a second Al—Mg—Si aluminum alloy material to a single Al—Mg aluminum alloy material, and provides a vehicle door including this joined body.

According to an aspect of the present invention, a joined body of dissimilar aluminum alloy materials is provided, including a first Al—Mg—Si aluminum alloy material, a second Al—Mg—Si aluminum alloy material, and a single Al—Mg aluminum alloy material. The joined body of dissimilar aluminum alloy materials is formed by welding the first Al—Mg—Si aluminum alloy material and the second Al—Mg—Si aluminum alloy material to the single Al—Mg aluminum alloy material. The Al—Mg aluminum alloy material and the first Al—Mg—Si aluminum alloy material are joined by arc welding, and the Al—Mg aluminum alloy material and the second Al—Mg—Si aluminum alloy material are joined by friction-stir welding.

Friction-stir welding has the advantage of being able to easily obtain a high positional accuracy between two members to be welded because the two members are welded with the butted surfaces thereof brought into intimate contact with each other, while arc welding has the advantage of being able to control accumulated dimensional errors at the arc-welded portion between the aforementioned single Al—Mg aluminum alloy material and the second Al—Mg—Si aluminum alloy material because a slight gap is set between the two aluminum alloy materials before these two materials are arc-welded.

A high-strength Al—Mg aluminum alloy material having an Mg content of approximately 4.5 percent and a moderate-strength Al—Mg aluminum alloy material having an Mg content in the range of 2.2 through 2.8 percent are known Al—Mg aluminum alloy materials. According to the present invention, either of these two types of Al—Mg aluminum alloy materials can be used; however, a moderate-strength Al—Mg aluminum alloy material combines particularly well with an Al—Mg—Si aluminum alloy material, so that a joined body which is well-balanced to both arc welding and friction-stir welding is obtained.

The present invention can be suitably applied to a vehicle door. In an embodiment of a vehicle door according to an aspect of the present invention, the first Al—Mg—Si aluminum alloy material constitutes a door frame of a vehicle door, the Al—Mg aluminum alloy material constitutes a bracket of the vehicle door, and the second Al—Mg—Si aluminum alloy material constitutes an inner panel of the vehicle door or an intermediate bracket which connects the inner panel and the bracket to each other.

According to the present invention, in a joined body of dissimilar aluminum alloy materials including a first Al—Mg—Si aluminum alloy material, a second Al—Mg—Si aluminum alloy material, and a single Al—Mg aluminum alloy material, wherein the join body of dissimilar aluminum alloy materials is formed by welding the first Al—Mg—Si aluminum alloy material and the second Al—Mg—Si aluminum alloy material to the single Al—Mg aluminum alloy material, the Al—Mg aluminum alloy material and the first Al—Mg—Si aluminum alloy material can be joined by arc welding, and the Al—Mg aluminum alloy material and the second Al—Mg—Si aluminum alloy material can be joined by friction-stir welding.

With this joined body, it is possible to improve the positional accuracy and to suitably control accumulated dimensional errors, and to enhance design flexibility.

BRIEF DESCRIPTION OF THE DRAWINGS

The present invention will be discussed below in detail with reference to the accompanying drawings, in which.

DESCRIPTION OF THE EMBODIMENT

Figure 1:
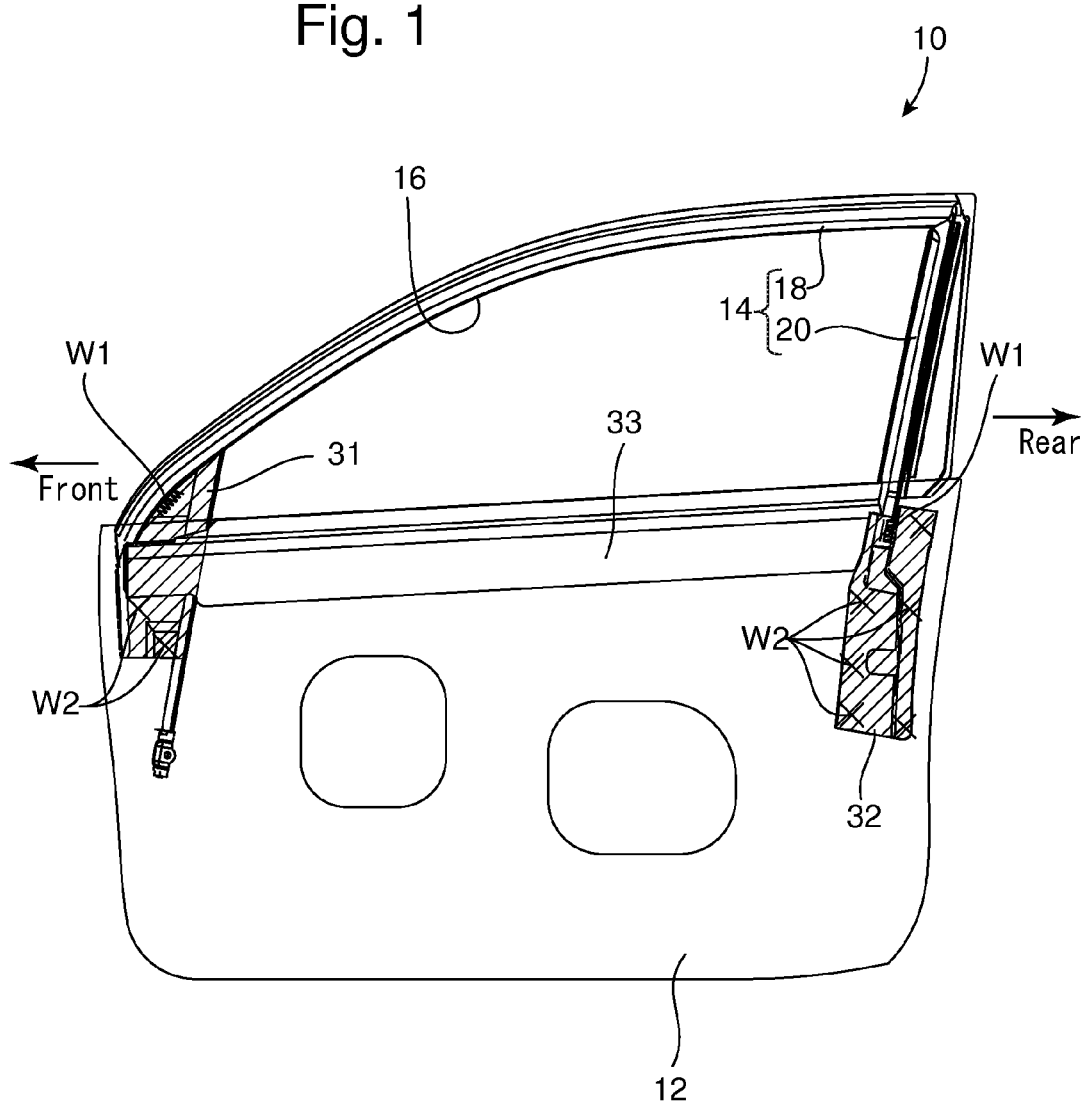
FIG. 1 is a side elevational view of an embodiment of an aluminum door (vehicle door) according to the present invention.

FIG. 1 shows the framework of an aluminum front door (vehicle door) 10 for a front seat of a motor vehicle. The front door 10 is provided with an inner panel 12 and a door frame 14, which is formed into a frame shape on of the upper side of the inner panel 12. A window pane (not shown) moves up and down in a window opening 16, which is surrounded by the upper edge of the inner panel 12 and the inner edge of the door frame 14. The door frame 14 is provided with an upper sash 18 which forms the upper edge of the front door 10 and an upright pillar sash 20 which is formed to extend upward from the rear of the inner panel 12, and the rear end of the upper sash 18 and the upper end of the upright pillar sash 20 are joined together at the upper rear corner (upper right corner with respect to FIG. 1) of the front door 10. The inner panel 12, together with an outer panel (not shown) that is positioned on the vehicle external side, constitutes a door panel. A front lower part of the upper sash 18 is fixed to the inner panel 12 via a mirror bracket 31, and a lower portion of the upright pillar sash 20 is fixed to the inner panel 12 via a lock bracket 32. The front door 10 is provided with a beltline reinforcement member 33 which extends in the forward/rearward direction of the vehicle. The beltline reinforcement member 33 is fixed at the front and rear ends thereof to the mirror bracket 31 and the lock bracket 32, respectively. In FIG. 1, the mirror bracket 31 and the lock bracket 32 are hatched for the sake of clarity.

The inner panel 12 is a first member made of an Al—Mg—Si aluminum alloy material (JIS 6000-series aluminum alloy material) and the door frame 14 (the upper sash 18 and the upright pillar sash 20) is a second member made of the same material as the first member, i.e., an Al—Mg—Si aluminum alloy material (JIS 6000-series aluminum alloy material). Whereas, the mirror bracket 31 and the lock bracket 32 are made of a moderate-strength Al—Mg aluminum alloy material (JIS 5000-series aluminum alloy material) having an Mg content in the range of 2.2 through 2.8 percent. The door frame 14 (specifically the upper sash 18 thereof) and the mirror bracket 31 are joined by arc welding at a welded part W1. Likewise, the door frame 14 (specifically the upright pillar sash 20 thereof) and the lock bracket 32 are joined by arc welding at a welded part W1. The mirror bracket 31 and the inner panel 12 are joined by friction-stir welding at two joining points W2, and the lock bracket 32 and the inner panel 12 are joined by friction-stir welding at a plurality of joining points W2.

Figure 2:
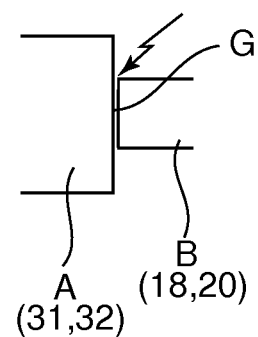
FIG. 2 is a conceptual diagram of portions of the aluminum door shown in FIG. 1 which are joined by arc welding.

As shown conceptually in FIG. 2, arc welding is a known joining process in which two members A and B (to be joined) are butted with an air-gap G therebetween, and thereafter the air-gap G is filled with molten metal that is melted by electric arc to join the butted surfaces.

Figure 3:
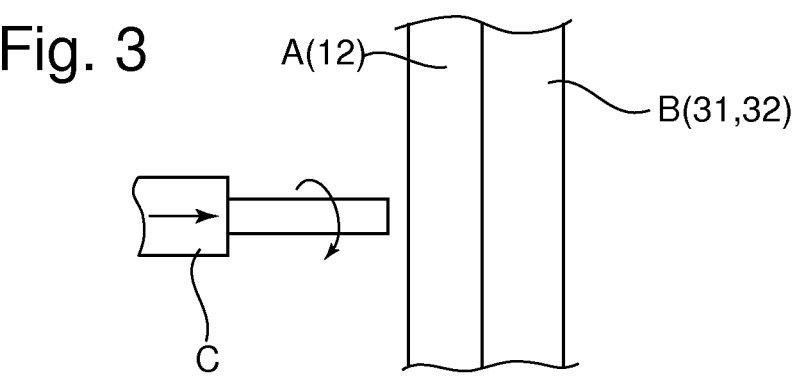
FIG. 3 is a conceptual diagram of portions of the aluminum door shown in FIG. 1 which are joined by friction-stir welding.

Friction-stir welding, shown conceptually in FIG. 3, is a known joining process. In this process, two members A and B to be joined are butted (superposed), a probe fixed to the end of a cylindrical tool C is penetrated into the joint between the two members A and B by firmly pressing the probe against the joint with a great force while rotating the tool C to thereby create frictional heat to soften (without melting) the welding base material, and the spinning of the tool C then causes the two members A and B to deform plastically at and around the joining location and to intermix thereat to thereby join the two members A and B.

In the above described embodiment of the welded structure, with the two brackets 31 and 32 as a reference, the door frame 14 is joined to one of two sides (inner and outer sides spaced from each other in the widthwise direction of the vehicle) of each bracket 31 and 32 by arc welding, and the inner panel 12 is joined to the other side of each bracket 31 and 32 by friction-stir welding. According to this welded structure, the inner panel 12 and each bracket 31 and 32 are welded to each other by friction-stir welding, thus being brought into intimate contact with each other before being welded. Accordingly, this intimate-contact point can be taken as a positional reference. On the other hand, the door panel 14 and each bracket 31 and 32 are joined by arc welding, so that a gap is set therebetween before the door panel 14 and each bracket 31 and 32 are welded. The width of this gap is adjustable in the range of, e.g., from 0.0 to 2.0 mm, which achieves the advantage of making it possible to control accumulated dimensional errors at the arc-welded portion between the door panel 14 and each bracket 31 and 32 in the widthwise direction of the vehicle. Furthermore, the positional relationship between the friction-stir welding and the arc welding is reversible.

Additionally, in the joined body of the present embodiment, in which the door frame 14 (specifically the upper sash 18 thereof) and the mirror bracket 31 are joined by arc welding, the door frame 14 (specifically the upright pillar sash 20 thereof) and the lock bracket 32 are joined by arc welding, the mirror bracket 31 and the inner panel 12 are joined by friction-stir welding and the lock bracket 32 and the inner panel 12 are joined by friction-stir welding, the inner panel 12 and the door frame 14 are formed of an Al—Mg—Si aluminum alloy material (JIS 6000-series aluminum alloy material), and the mirror bracket 31 and the lock bracket 32 are formed of a moderate-strength Al—Mg aluminum alloy material (JIS 5000-series aluminum alloy material) having a Mg content of the range of 2.2 to 2.8 percent. More specifically, as the moderate-strength Al—Mg aluminum alloy material having a Mg content of the range of 2.2 to 2.8 percent, at least JIS 5052, 5021 or 5652 aluminum alloy material can be used. Additionally, the Al—Mg—Si aluminum alloy material is known as JIS 6000-series aluminum alloy material; specifically, JIS 6016 aluminum alloy material, JIS 6N01 aluminum alloy material or an aluminum alloy material equivalent to these aluminum alloy materials can be used. The components of the front door 10 except the door frame 14 (specifically the upper sash 18 and the upright pillar sash 20 thereof), the mirror bracket 31 and the lock bracket 32 can be formed of any material other than aluminum alloy materials.

Although the mirror bracket 31 and the lock bracket 32 are formed of a moderate-strength Al—Mg aluminum alloy material having a Mg content in the range of 2.2 through 2.8 percent in the above illustrated embodiment of the vehicle door, each bracket 31 and 32 can also be formed of a high-strength Al—Mg aluminum alloy material having a Mg content of approximately of 4.5 percent or another type of Al—Mg aluminum alloy material. In addition, although the above illustrated embodiment is a vehicle door to which the present invention has been applied, the present invention can be applied to general aluminum alloy materials.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A joined body of dissimilar aluminum alloy materials comprising a first Al—Mg—Si aluminum alloy material, a second Al—Mg—Si aluminum alloy material, and a single Al—Mg aluminum alloy material,
   wherein said joined body of dissimilar aluminum alloy materials is formed by welding said first Al—Mg—Si aluminum alloy material of a door frame (14) and said second Al—Mg—Si aluminum alloy material of an inner panel (12) to said single Al—Mg aluminum alloy material,
   wherein said Al—Mg aluminum alloy material (31 or 32) and said first Al—Mg—Si aluminum alloy material (14) are joined by arc welding, and
   wherein said Al—Mg aluminum alloy material (31 or 32) and said second Al—Mg—Si aluminum alloy material (12) are joined by friction-stir welding.

2. The joined body according to claim 1, wherein said Al—Mg aluminum alloy material comprises an Al—Mg aluminum alloy material having a Mg content of 2.2 through 2.8 percent.

3. A vehicle door comprising the joined body according to claim 1, wherein said first Al—Mg—Si aluminum alloy material constitutes the door frame of said vehicle door,
   wherein the door frame comprises an upper sash and an upright pillar sash,
   wherein a bracket is composed of said Al—Mg aluminum alloy material and comprises a mirror bracket or a lock bracket, and
   wherein, when the bracket comprises the mirror bracket, the mirror bracket is connected to said upper sash by arc welding and is connected to said inner panel by friction-stir welding, and
   wherein, when the bracket comprises the lock bracket, said lock bracket is connected to said upright pillar sash by arc welding and is connected to said inner panel by friction-stir welding.

* * * * *